Nov. 11, 1924.  1,515,081

W. E. TOELLE

AUTOMATIC SHUT-OFF VALVE

Filed May 11, 1922   3 Sheets-Sheet 1

INVENTOR
William E. Toelle
BY
Harry Jacobs
ATTORNEYS

Nov. 11, 1924.

W. E. TOELLE 1,515,081

AUTOMATIC SHUT-OFF VALVE

Filed May 11, 1922   3 Sheets-Sheet 2

INVENTOR
William E. Toelle
BY
Harry Jacobson
ATTORNEYS

Nov. 11, 1924.  
W. E. TOELLE  
1,515,081  
AUTOMATIC SHUT-OFF VALVE  
Filed May 11, 1922   3 Sheets-Sheet 3

INVENTOR  
William E. Toelle  
BY  
Harry Jacobson  
ATTORNEYS

Patented Nov. 11, 1924.

1,515,081

UNITED STATES PATENT OFFICE.

WILLIAM E. TOELLE, OF ELMHURST, NEW YORK.

AUTOMATIC SHUT-OFF VALVE.

Application filed May 11, 1922. Serial No. 560,026.

*To all whom it may concern:*

Be it known that I, WILLIAM E. TOELLE, a citizen of the United States, and resident of Elmhurst, in the county of Queens and State of New York, have invented certain new and useful Improvements in Automatic Shut-Off Valves, of which the following is a specification.

This invention relates to automatic shut-off valves and particularly to those capable of being actuated either by the action of heat or manually.

One of the objects of this invention is the provision of simple and efficient means comprising comparatively few parts and adapted particularly for use on the main source of gas supply to a building for automatically cutting off the gas in case of fire.

A further object of this invention is the provision of an inexpensive, positively operated, leak proof valve shut-off mechanism, in which no packing is used or needed, which is capable of being readily moved into and maintained in the valve opening position when desired and which is insensible to vibration or shock, while being adapted for quick manual operation in emergencies.

For the attainment of the aforesaid and other objects as will appear from the appended description, I employ the combinations and arrangements of parts shown in the preferred forms in the accompanying drawings, in which, Fig. 1 is a front elevation of my improved valve showing the operating links in full lines in the valve opening position thereof, and showing the same in dotted lines in the valve closing position.

Figure 3:
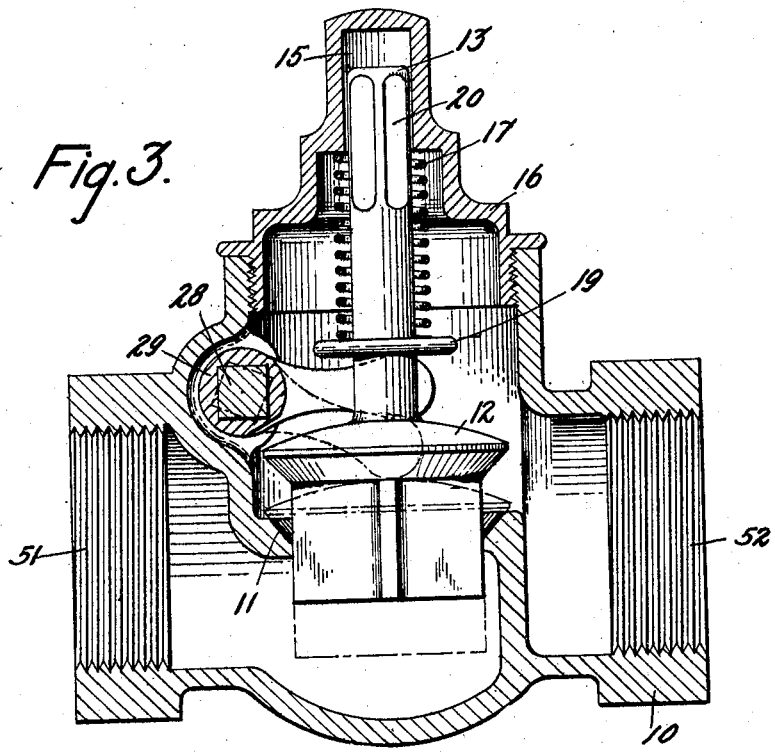
Fig. 3 is a vertical section on the line 3—3 of Fig. 2, showing in dotted lines the position assumed by the valve and the operating yoke in the closed position of said valve.

In the illustrated embodiment of my invention, the valve body 10 has an opening cut therein in the usual manner to form the bevelled valve seat 11, and carries the valve disc 12 for vertical reciprocation downwardly and upwardly toward and away from said seat. Said valve disc 12 is guided by the valve stem 13 at its upper end, in its reciprocatory movement, and by the usual radial guides 14 at its lower end. In that form of my improved valve shown in Figs. 1 and 3, the valve stem 13 is arranged to move in a suitable cylindrical opening 15 in the valve cap 16, which acts as a bearing for said stem, and which is removably attached to the valve body at the upper portion thereof. For urging said valve disc 12 toward its closed position on to its seat, a compression spring as 17 is provided, one end of said spring being in abutting contact with the upper end of the valve cap 16, while the other end abuts against the flange 19 on said valve stem. In that form of my improved valve shown in Fig. 7, the inlet opening 52 of the valve body 10 is raised sufficiently to position the valve seat at the lower part of said opening and to allow the free flow of gas without obstruction of the current. The outlet opening 51 is similarly lowered, allowing the free exit of the gas currents.

The upper part 20 of said stem 13 is suitably cut away by being made substantially triangular in cross section to provide a minimum contacting surface between said valve stem and the cylindrical bearing surface of the cap 16, whereby any danger of the sticking of the valve stem due to the entrance of foreign matter between the stem and said surface, is obviated. For reciprocating said valve stem and the valve disc attached thereto, a shaft 21 having one end 22 thereof suitably mounted in the bearing 50 of the valve body 10, and having the other end 23 thereof supported by the nut 24, is provided. It will be noted that the bearing 50 is positioned on one side of the center of the valve body 10 in all of the forms shown, and in those forms of the valve body shown in Figs. 1 and 7, said bearing is arranged between said center and the outlet opening 51.

For providing a minimum contacting surface between the shaft 21 and the supporting nut 24 for the reason above referred to in connection with the valve stem 13, said shaft is made substantially triangular in cross section with rounded corners. Said shaft 21 is arranged substantially horizontally and at right angles to the axis of the valve stem for the convenient operation of said stem.

A leak proof joint is provided at the point where said shaft 21 passes through the valve body 10, by means of a rounded or partly spherical flange 25 projecting aronud said shaft, said flange being adapted to engage a concavely rounded surface on the nut 24 near the end thereof. It will be seen that said rounded surfaces form a tight joint without the need for packing material around the shaft 21, and that slight variations in the alignment of said shaft, accidental bending thereof, or inaccuracies in the manufacture thereof, do not affect the efficacy of the joint.

A suitable compression spring 26 is arranged in the bearing 50 projecting from the body 10, and is adapted to engage and press against the inner end of the operating shaft 21, whereby the rounded surface 27 of said shaft is urged into close engagement with said nut, making a tight joint and preventing leakage thereat, without the use of packing. A portion 28 of said shaft 21 is made square in cross section and is adapted to pass through a square hole in the yoke 29 for mounting said yoke on said square portion 28, said yoke engaging the under side of the flange 19 of the valve stem, whereby operation of the shaft 21 and oscillation of the yoke 29 acts to raise the valve stem 13 against the action of the spring 17.

The means for permitting automatic actuation of the valve stem 13 for shutting off the gas will now be described.

Figure 4:
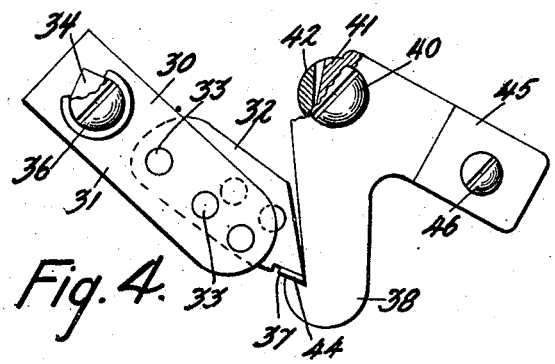
Fig. 4 is a front view of one form of the fusible link and of the detent crank, showing said link in the act of shearing apart to close the valve.
Figure 5:
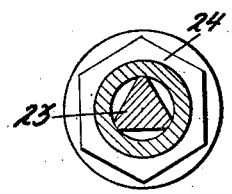
Fig. 5 is a vertical section on the line 5—5 of Fig. 2 showing a detail of the stuffing box for the yoke operating shaft.
Figure 6:
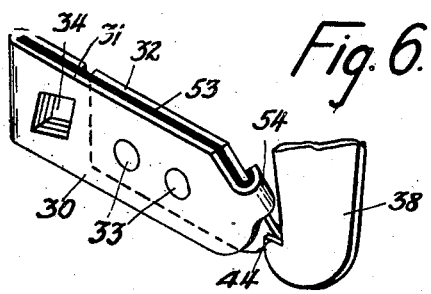
Fig. 6 is a perspective view of another form of my improved fusible link.

A preferably flat link 30 is connected to the shaft 21, said link comprising the outer member 31 and the inner member 32, said members being connected by means of fusible metal rivets 33, inserted in suitable holes made in both of said members in proper registration, as shown in Figs. 4 and 6. The link 30 while designed to be sheared apart when the fusible rivets 33 are softened, may as a whole be termed a "fusible link." The square aperture 34 at the end of said link 30 fits over the squared end 35 of the shaft 21, a screw as 36 serving to prevent the separation of said link from said shaft. It will be seen that after the valve disc has been lifted into the valve opening position thereof, said disc may be maintained in said position by preventing the dropping down of the end 37 of the link member 32. This is accomplished by causing said end 37 to engage the hooked end 44 of the dentent crank 38, which is pivotally mounted on a horizontally extending arm 39, preferably integral with and extending from the valve body 10, by means of a suitable screw as 40. A suitable groove may be made in the hook end 44 as shown in Fig. 6 for receiving the end 37 of the member 32, or said end 32 may be made sufficiently wide to allow for side play due to possible vibration or shock without slipping out of contact or becoming disengaged from the end 44, as shown in Fig. 4.

For insuring the quick and positive operation of the releasing means, and minimizing the time in which the valve closing operation occurs, a sheet 53 of mica, is arranged between the members 31 and 32, as shown in the modified form illustrated in Fig. 6, the projecting portion 54 of the member 31 being turned over on to the member 32 with the mica sheet end therebetween. Said members 31 and 32 are normally urged to rotate in a clockwise direction under the influence of the spring 17 while the detent crank 38 is urged into engagement with the right end of the member 32 by means of the coil spring 43. Said member 32 tends to rotate about the hooked end 44 while maintaining its engagement with the projection 54 when the rivets 33 are softened by heat, allowing the member 31 to rotate with the shaft 21 urged thereto by the spring 17, the valve disc 12 being then unrestrainedly brought down on to its seat.

It will be noted that the arm 39 is arranged between the center of the valve body 10 and the inlet opening 52, whereby a compact arrangement of the parts is made possible. The detent crank 38 has a cylindrical portion 41 thereon having a circular segmental groove, the wall of which is adapted to engage an outstanding stop lug 42 projecting from said arm 39, whereby the amount of the rotary movement of said crank 38 is limited. A coil spring 43, mounted on said arm 39 engages said detent crank 38 and serves to urge and to maintain the hook end 44 of said crank in engagement with the wide end 37 of the link member 32 until released, as when the end 45 of said crank is pulled upwardly, said end 45 being suitably slitted and perforated to allow the connection thereto of a pull cable as by means of a screw 46.

It will be understood that when the temperature in the vicinity of my improved valve rises abnormally, as during a fire, the fusible metal rivets 33 are softened to such an extent that the members 31 and 32 are readily and positively sheared apart under the influence of the springs 17 and 43, as shown in Fig. 4, whereupon the spring 17 becomes free to move the valve disc 12 down on to its seat, since rotation of the yoke 29 and the yoke operating shaft 21 are no longer prevented by the detent crank 38.

Figure 1:
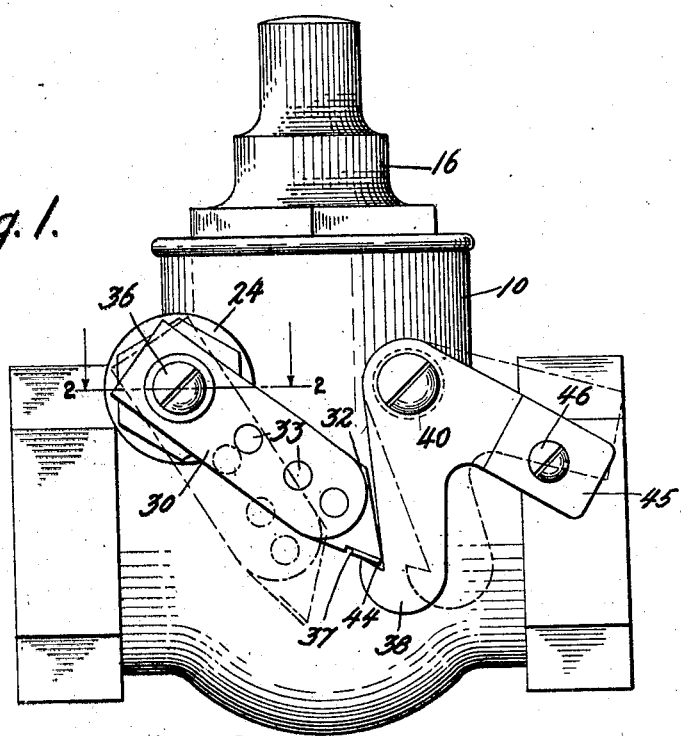
Figure 2:
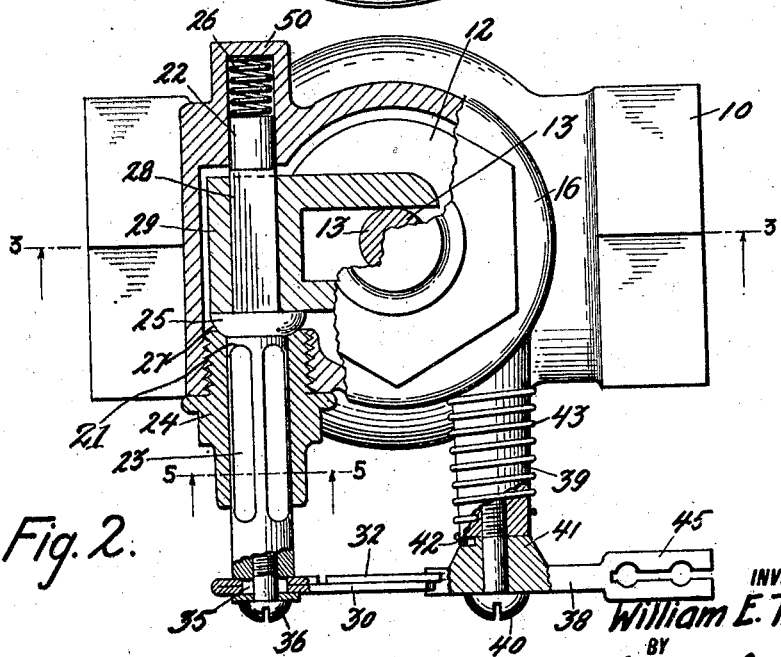
Fig. 2 is a top plan view and partial section of my invention, taken on the line 2—2 of Fig. 1.

The same result can be obtained by pulling the end 45 of the crank 38 upwardly, whereby said crank is rotated, withdrawing the hook end 44, which is normally in engagement with the end 37 of the member 32, from said end 37 as indicated by the dotted lines in Fig. 1, thereby freeing the shaft 21 and the yoke 29 for rotation under the influence of the spring 17 to close the valve and shut off the supply of gas. To reposition the parts in the valve closing position thereof, the end 37 of the member 32 is drawn up and again caught on the hook end 44, whereby the shaft 21 rotates the yoke 29, which engages and raises the flange 19 of the stem 13 and lifts the disc 12 off its seat 11.

Figure 7:
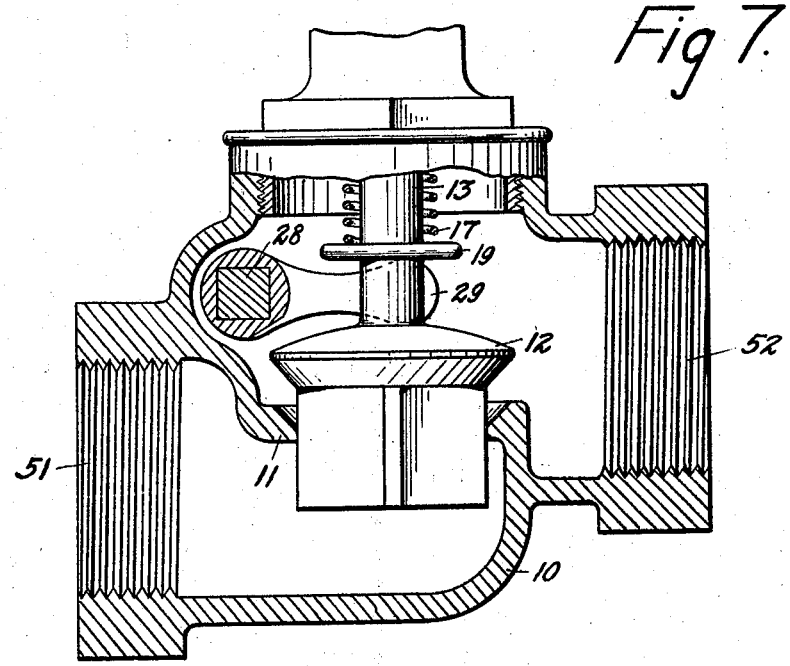
Fig. 7 is a partial vertical section of a modified form of the body of my improved valve.
Figure 8:
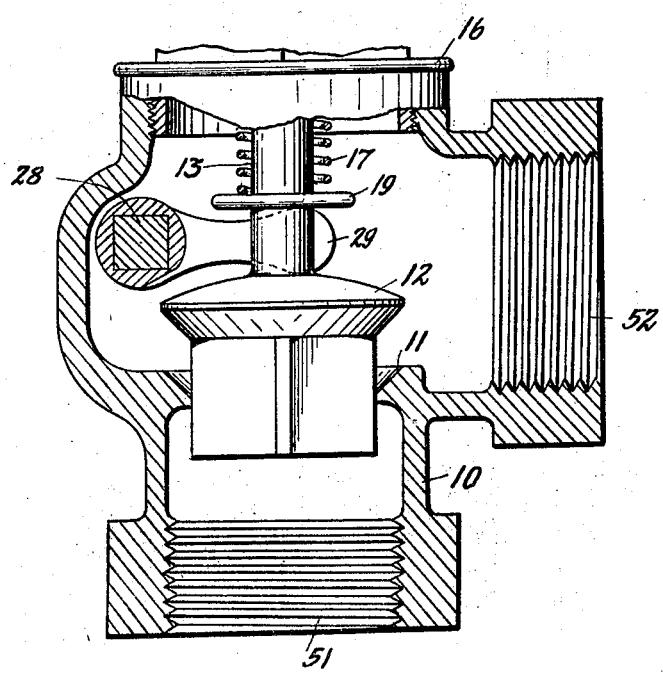
Fig. 8 is a similar view showing the valve body adapted to connect inlet and outlet pipes substantially at right angles to each other.

In that form of my improved valve shown in Fig. 7, the valve body 10 is modified to allow freer movement of the gas currents, while in that form shown in Fig. 8, the valve body has the outlet opening 51 thereof disposed with its axis substantially perpendicular to the axis of the inlet opening 52, the operating parts being the same as in the other form of valve body shown and described herein, it being understood that any of the types of valve bodies shown may be used in connection with my invention without departing from the spirit thereof.

It will be noted that my improved valve is designed to prevent leakage without the use of packing, that it is compact, that it comprises but few parts, and that positive operation of the valve closing mechanism is assured not only when the link is sheared apart, but also when the detent crank is manually disengaged from the link.

I claim:

1. In an automatic shut-off valve, a valve stem, a valve disc at the lower extremity of said stem, a flange on said stem above said valve disc, a yoke arranged between said flange and said disc and adapted to engage said flange, means whereby said stem may be reciprocated operatively connected to said yoke, means for normally maintaining said valve disc in its uppermost position comprising a detent crank and shearable means engaged by said crank and connected to said first mentioned means, said shearable means adapted to be released from said detent crank for allowing said disc to drop when the temperature of said shearing means is abnormally raised.

2. In an automatic shut-off valve, a spring pressed valve disc and means operatively connected to said disc for maintaining said disc in valve opening position comprising a stem upstanding from said disc, a flange on said stem above said disc, a yoke arranged to engage said flange, an operating shaft carrying said yoke, a fusible link on the extremity of said shaft, and a pivoted detent crank for engaging said link and maintaining said link in its valve opening position until manually released.

3. In an automatic shut-off valve, a valve body having an inlet and an outlet chamber, a valve disc, a spring for urging said disc into valve closing position, means for guiding said disc in the movement thereof, an operating shaft passing through one of said chambers in said valve body, and substantially triangular in cross section with rounded corners, means for operatively connecting said disc and said shaft, and manually operable means connected to said shaft and adapted to be automatically released through the agency of heat for moving said shaft and normally maintaining said shaft in the valve opening position, comprising a two piece shearable link the parts of which are adapted to be sheared apart on an abnormal rise of temperature, mica insulation separating the parts of said link, fusible rivets passing through both pieces of said link and through said insulation, a spring-pressed, pivoted, detent crank normally engaging said link for maintaining said shaft in valve opening position, and a stop for limiting the movement of said crank.

4. In an automatic shut-off valve, a valve body, a seat in said body, a valve disc, a spring for urging said valve disc into its closing position on said seat, means for guiding said disc, means operatively connected to said disc for controlling the movement of said disc, an arm projecting from said valve body, a coil spring on said arm, a stop on said arm, and a detent crank pivoted to said arm and adapted to be forced by said spring into engagement with said stop for maintaining said valve-disc movement controlling means in the valve opening position thereof.

5. In an automatic shut-off valve, a valve body having an inlet and an outlet chamber, a spring-pressed valve disc, a disc operating shaft in one of said chambers having a substantially triangular cross section with rounded corners, means for operatively connecting said disc and said shaft, means removably secured to said body for supporting one end of said shaft and for cooperating with said shaft preventing leakage around said shaft, a bearing on said body for supporting the other end of said shaft, a spring in said bearing for urging said shaft toward said first mentioned supporting means, a link on the first mentioned supported end of said shaft comprising parts adapted to be sheared apart when the temperature thereof is abnormally raised, and spring pressed pivoted means for engaging said link mounted for limited movement for normally maintaining said shaft in the valve opening position thereof.

6. In an automatic shut-off valve, a valve body, a valve seat in said body, a spring-pressed valve disc, means for guiding said disc for movement to and from said seat, a valve disc operating shaft, a bearing on said body for one end of said shaft, means operatively connecting said shaft and said disc arranged on said shaft, and means for maintaining said shaft in the valve opening position thereof until released, comprising a fusible link on said shaft, spring-pressed means for engaging said link to hold said link in its operative position, and means for limiting the movement on said spring-pressed means.

7. In an automatic shut-off valve, a valve body, a spring pressed valve disc slidably mounted in said body, means for raising said disc to the open position thereof, and means cooperating with said disc raising means for maintaining said disc in said position comprising a link formed of two members adapted to be sheared apart under the action of heat, and a manually operable detent crank pivoted to said body for normally maintaining said link in the disc raising position thereof, said crank having a circular segmental groove in the inner side thereof, and a lug projecting from said body arranged to operate in said groove, said lug being adapted to engage the ends of the wall of said groove for limiting the rotary movement of said crank.

8. In an automatic shut-off valve, means adapted to be set into valve opening position, means for urging said first mentioned means into valve closing position, and manually operable means for maintaining said first mentioned means in said valve opening position until manually or automatically released, said first mentioned means comprising a link of two members and mica heat insulation between said members, fusible rivets connecting said members, said manually operative means comprising a detent crank having one arm arranged to engage the end of one of said members in the valve opening position thereof and having a second arm adapted to be manipulated for disengaging said first arm from said link and allowing all of the aforesaid means to move into the valve closing positions thereof, a coil spring for normally maintaining said crank in valve opening position, and means for limiting the movement of said crank by or against said spring.

9. In an automatic shut-off valve, a valve body having an inlet and an outlet opening, a valve disc, means operatively connected to said disc for controlling the vertical position of said disc, a bearing on said body for supporting said means, a detent crank for maintaining said means in the valve opening position thereof, an arm on said body disposed between said inlet opening and said center line of said valve body for supporting said crank, said crank having a circular segmental groove in the side thereof, and a lug portion projecting from said arm into said groove and adapted to engage the ends of the wall of said groove for limiting the rotary movement of said crank in either direction.

10. In an automatic shut-off valve, a valve disc, a valve stem extending upwardly from said disc, means for guiding the upper end of said stem, a flange above said disc, a yoke adapted to engage said flange, arranged between said disc and said flange, means operatively connected to said yoke for reciprocating said stem, and heat sensitive means engaging said last mentioned means for maintaining said stem in its upermost position until released manually or under the action of heat.

Signed at the city of New York, in the county of New York and State of New York, this 4th day of May, 1922.

WILLIAM E. TOELLE.